United States Patent [19]

Röhm

[11] Patent Number: 4,945,819

[45] Date of Patent: Aug. 7, 1990

[54] CLAMPING APPARATUS FOR THE ROTARY SPINDLE OF A MACHINE TOOL

[76] Inventor: Günter H. Röhm, Heinrich-Röhm-Strasse 50, 7927 Sontheim, Fed. Rep. of Germany

[21] Appl. No.: 370,247

[22] Filed: Jun. 22, 1989

[30] Foreign Application Priority Data

Aug. 2, 1988 [DE] Fed. Rep. of Germany ....... 3826215

[51] Int. Cl.$^5$ ...................... F01B 31/14; F15B 15/24; B23B 5/22; B23B 31/10
[52] U.S. Cl. ................................. 92/13.1; 92/13.6; 92/106; 92/110; 279/4
[58] Field of Search ................ 279/4; 92/13, 13.1, 92/13.6, 13.8, 106, 109, 111, 54, 55

[56] References Cited

U.S. PATENT DOCUMENTS

| | | | |
|---|---|---|---|
| 3,020,057 | 2/1962 | Gamet | 92/106 |
| 3,167,155 | 1/1965 | Geyer | 92/13.1 |
| 3,456,955 | 7/1969 | Bruinsmn | 279/4 |
| 3,978,884 | 9/1976 | Sunstrom | 92/13.6 |
| 3,999,770 | 12/1976 | Sollami | 279/4 |
| 4,825,755 | 5/1989 | Takano | 92/13.6 |

FOREIGN PATENT DOCUMENTS

| | | | |
|---|---|---|---|
| 0064641 | 11/1982 | European Pat. Off. | 92/13.1 |
| 0091891 | 10/1983 | European Pat. Off. | 279/4 |
| 930425 | 6/1955 | Fed. Rep. of Germany | 279/4 |
| 2515019 | 10/1975 | Fed. Rep. of Germany | 92/13.6 |
| 2612308 | 10/1976 | Fed. Rep. of Germany | 92/13.6 |
| 2353120 | 5/1984 | Fed. Rep. of Germany | 279/4 |
| 0073205 | 5/1982 | Japan | 92/13.1 |
| 72093 | 5/1944 | Norway | 92/106 |
| 0861773 | 9/1981 | U.S.S.R. | 92/13.1 |
| 739140 | 10/1955 | United Kingdom | 92/13 |

*Primary Examiner*—Edward K. Look
*Assistant Examiner*—Thomas Denion
*Attorney, Agent, or Firm*—Herbert Dubno

[57] ABSTRACT

The chuck or collet actuating apparatus for a machine tool comprises a rotating clamping cylinder, an axially slidable clamping piston rotating with the clamping cylinder and a coaxial cylindrical projecting portion in the clamping cylinder. The projecting portion carries a thread, on which a threaded ring is guided and engaged. This threaded ring is provided with a coaxial undercut annular groove in an opposing surface facing the clamping cylinder and is securable against rotation on the projecting portion. A plurality of stop pins are provided which are axially unshiftable relative to the threaded ring and which engage and slide in the annular groove. The stop pins project through an opposing wall of the clamping cylinder into an interior space of the cylinder axially slidable and sealing axially. These stop pins form a stop for the clamping piston limiting its displacement.

7 Claims, 3 Drawing Sheets

CLAMPING APPARATUS FOR THE ROTARY SPINDLE OF A MACHINE TOOL

FIELD OF THE INVENTION

My present invention relates to a clamping apparatus for the rotating spindle of a machine tool, such as a lathe.

BACKGROUND OF THE INVENTION

A chuck or collet actuating apparatus is known (German Patent Document DE-OS No. 31 17 850) which is part of a machine tool and which comprises a rotating clamping cylinder, an axially slidable clamping piston mounted in the clamping cylinder rotating with it and a coaxial cylindrical projecting portion in the clamping cylinder of a diameter smaller than the clamping piston diameter.

In this apparatus the clamping piston always performs the same axial clamping displacement even when a shorter clamping displacement would suffice as apparent from the clamping process.

OBJECT OF THE INVENTION

It is an object of my invention to provide an improved chuck or collet actuating apparatus for a rotating spindle of a machine tool having a clamping piston in a clamping cylinder in which the displacement of the clamping piston in the clamping cylinder is bounded in a simple way and this bounded displacement can be adjusted as desired.

Another object of my invention is to provide an improved actuator for the axially displaceable member of a power chuck or collet-tightening mechanism which avoids drawbacks of the prior art.

SUMMARY OF THE INVENTION

This object and others which will become more readily apparent hereinafter are attained in accordance with my invention in a chuck or collet actuating apparatus comprising a rotating clamping cylinder, an axially slidable clamping piston mounted in the clamping cylinder rotating with it and a coaxial cylindrical projecting portion.

According to my invention, the projecting portion carries a coaxial thread, on which a threaded ring is engaged, which is securable in a fixed location in its rotary position on the projecting portion and has a coaxial undercut annular groove on its opposing surface facing the clamping cylinder, in which a plurality of stop pins slidable in the annular groove but axially fixed relative to the threaded ring are disposed and engaged. These stop pins project into the cylinder interior axially slidable and seal axially the opposing wall of the clamping cylinder and form stops for the clamping piston.

When the threaded ring is rotated on the projecting portion, it moves correspondingly axially and takes the stop pins with it, which thus move axially in the clamping cylinder and Hence change the displacement limit for the clamping piston. Hence the displacement limit is set and its adjustability is determined so that the maximum clamping displacement is not always performed, but the clamping displacement can be adjusted to the actual required length and time can be saved because of the use of a shortened clamping displacement.

In one advantageous embodiment of my invention, the annular groove has a radial mouth on the inside of the threaded ring, through which the stop pins are introduced into the annular groove with bolt heads fitting into the undercut annular groove. The stop pins are fed as a group into the clamping cylinder and they are distributed uniformly over the cylinder circumference. The mechanism for fixing the threaded ring on the projecting portion of the clamping piston comprises appropriately a plurality of securing screws or setscrews fed radially into the threaded ring distributed around its circumference.

To adjust the clamping displacement, the threaded ring can be rotated on the projecting portion by hand while the spindle of the machine tool is halted. It is also possible to provide a controllable drive mechanism for rotation of the threaded ring on the projecting portion, especially a motorized drive mechanism. Instead of this, however, a controllable braking device acting on the threaded ring for rotation of the threaded ring on the projecting portion and a drive rotating the clamping cylinder about a controllable angle can be provided. For rotation of the threaded ring the threaded ring is fixed by the braking device, while the drive rotates the clamping cylinder and/or the machine tool spindle carrying the clamping cylinder about the controllable angle. This angle understandably can be more than 360° and many times 360°. Appropriately the arrangement can also be such that the drive and/or braking device acting on the threaded ring can engage by an engagable and disengagable coupling or clutch on the threaded ring.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
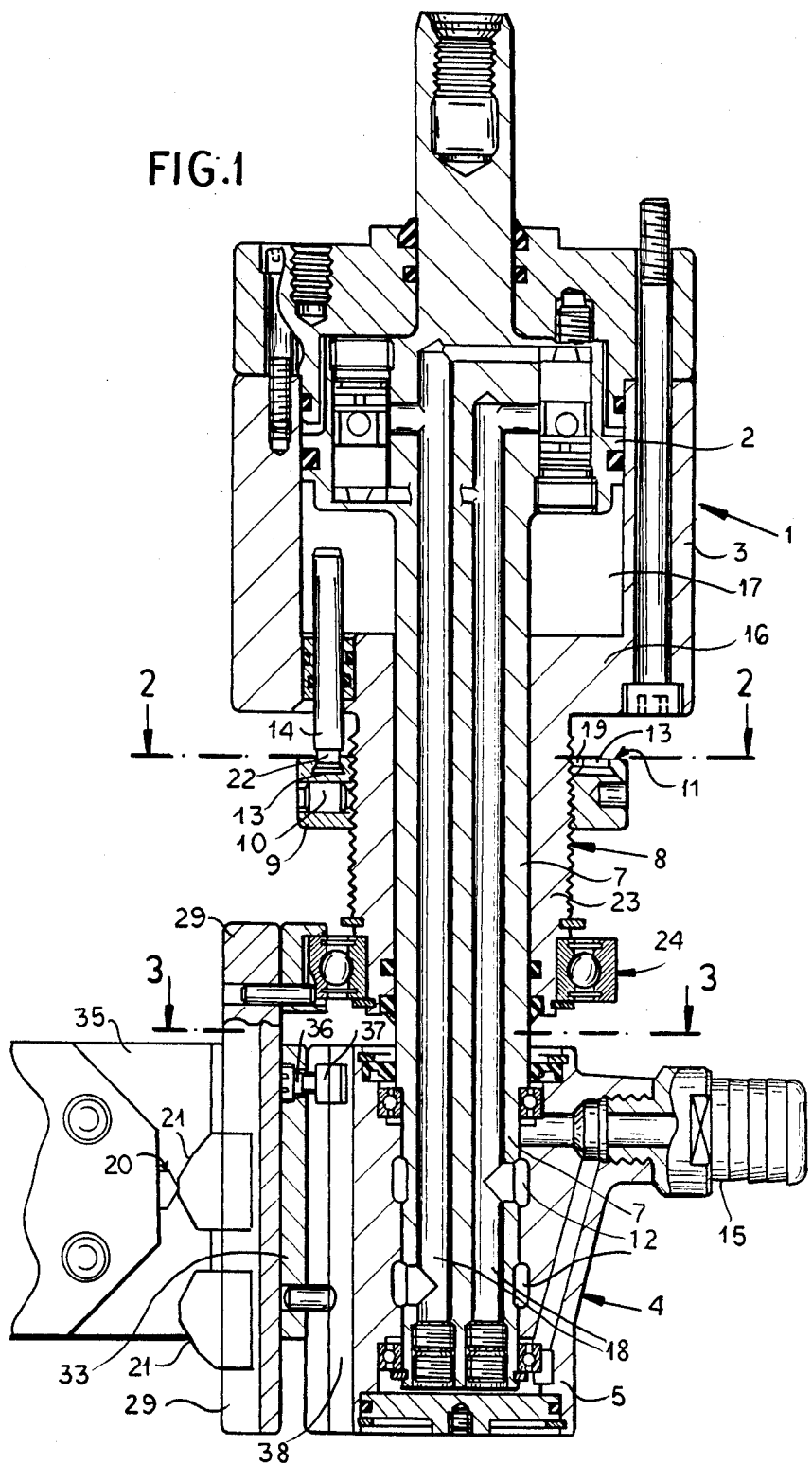
FIG. 1 is an axial cross-sectional view through a chuck or collet actuating apparatus for a machine tool according to my invention.
Figure 2:
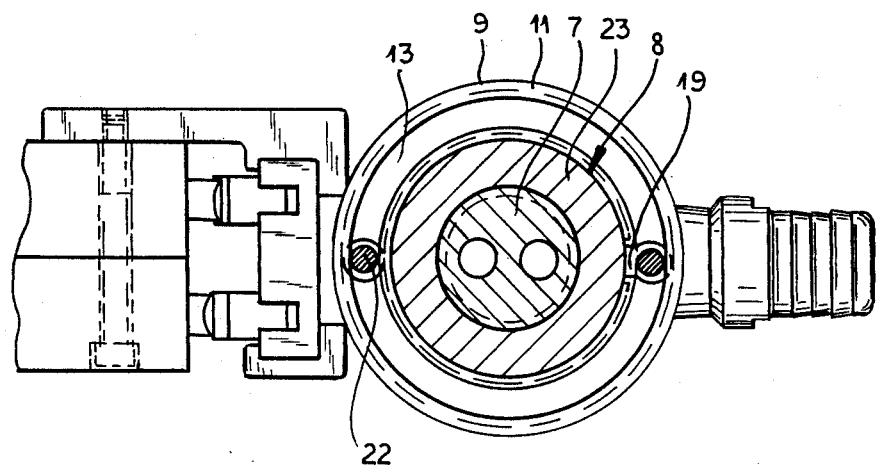
FIG. 2 is a partially plan, partially cross-sectional view through the chuck or collet actuating apparatus taken along the section line II—II of FIG. 1 as seen in the direction of the arrows.
Figure 3:
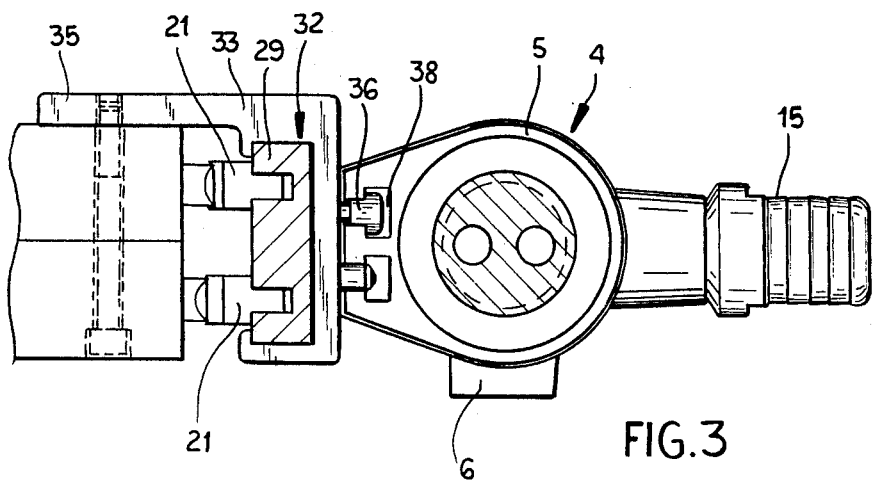
FIG. 3 is a partially plan, partially cross sectional view taken along the section line III—III of FIG. 1 as seen in the direction of the arrows.

The clamping cylinder 1 shown in the drawing for the chuck or collet actuating apparatus of my invention in the machine tool comprises a cylinder housing 3 with a clamping piston 2 slidable in it, which is connected on its top portion as seen in the drawing with a connecting rod to the chuck or collet mechanism on a machine tool spindle (not shown).

Normally the cylinder housing 3 is attached to one end of the machine tool spindle and rotates with it along with the clamping piston 2.

A distributor indicated generally at 4 is connected with the clamping cylinder 1. This distributor 4 has a distributor housing 5 not rotating with the clamping cylinder 1, which carries lateral connectors 6 for the working medium operating the clamping cylinder 1.

In the distributor housing 5 a distributor shaft 7 rotates, on which the distributor housing 5 is rotatably mounted and is held axially unshiftable. The distributor shaft 7 is connected rigidly with the clamping piston 2 and is mounted in the wall of the clamping cylinder 1 axially unmovable at 16. As a result, a displacement of the clamping piston 2 in the axial direction is transmitted unchanged by the distributor shaft 7 to the distributor housing 5.

The circular groove 12 running around the inside of the distributor housing 5 is for the discharge and feed of the working medium and connects with the connector 6 for the working medium. Lubricating oil between the distributor shaft 7 and the distributor housing 5 is conducted into the apparatus through the oil connector 15. The distributor shaft 7 has two shaft ducts 18 leading to opposite sides of the clamping piston 2 in the clamping cylinder 1, which are connected with the circular groove 12. The control of the working medium fed to one of sides of the clamping piston 2 according to choice occurs in a standard way and needs no description.

A control mechanism is provided in the apparatus for control of the axial displacement of the clamping piston, which comprises a contacting switch 20 and two switch pieces 21 each having a cam surface for operation of the contacting switch 20. The contacting switch 20 is connected with the distributor housing 5 and participates in its axial sliding.

Further a beam 29 is guided axially slidable on the distributor housing 5 in a longitudinal guide 32. The beam 29 carries the switch piece 21. The axially securing of the beam 29 to the clamping cylinder 1 occurs with the help of a bearing 24 allowing its rotation on a coaxial cylindrical projecting portion 23 of the clamping cylinder 1.

The beam 29 is secured in the longitudinal groove 32 against rotating along with the clamping cylinder 1 and is radially supported relative to the axis of the distributor housing 5. In particular, a guiding body 33 attached to the distributor housing 5 acts to form a longitudinal guide 32 for this beam 29. The longitudinal groove 32 is U-shaped in cross section.

The guiding body 33 is provided with a supporting piece 35 for the contacting switch 20 attached with the distributor housing 5 and is axially slidable and held fixed in the distributor housing 5 in its shifted position. For this purpose clamping bolts 36 are provided whose nuts 37 are slidable in the T-shaped groove 38 of the distributor housing 5.

The projecting portion 23 carries a coaxial thread 8 between the bearing 24 for the beam 29 on one end and the clamping cylinder 1 on the other end, on which a threaded ring 9 is fed or guided so that the threaded ring 9 rotates on the thread 8 and Hence its axial position on the projecting portion 23 can be varied. In various positions the threaded ring 9 can be secured to the projecting portion 23. Setscrews 10 engaged radially in the threaded ring 9 distributed circumferentially can tighten the threaded ring 9 against the projecting portion 23.

The threaded ring 9 has a coaxial undercut annular groove 13 in its opposing surface 11 facing the clamping cylinder 1, in which stop pins 14 slidable in the annular groove are introduced and are engaged. These stop pins 14 are engaged axially unshiftable in the threaded ring 9. These stop pins 14 are guided axially slidable in the in the opposing wall 16 of the cylinder housing 3 and seal and protrude axially through the opposing or facing wall 16 of the clamping cylinder 1, where they form stops for the clamping piston 2. In the embodiment shown two such stop pins and three setscrews 10 are provided.

The annular groove 13 has a mouth 19 opening radially to the inside of the threaded ring 9, through which the stop pins 14 can be fed into(or removed from) the annular groove 13 radially with bolt heads 22 fitting in the undercut annular groove 13. The bolt heads 22 are axially shaped to fit in the annular groove 13.

If the threaded ring 9 rotates on the projecting portion 23 and is axially moved on the projecting portion 23. Hence, the stop pins 14 with their bolt heads 22 secured in the annular groove 13 are carried along and slid axially into the cylindrical interior of the clamping cylinder 1. Thus the displacement range or limit for the clamping pistons 2 correspondingly changes.

Figure 4:
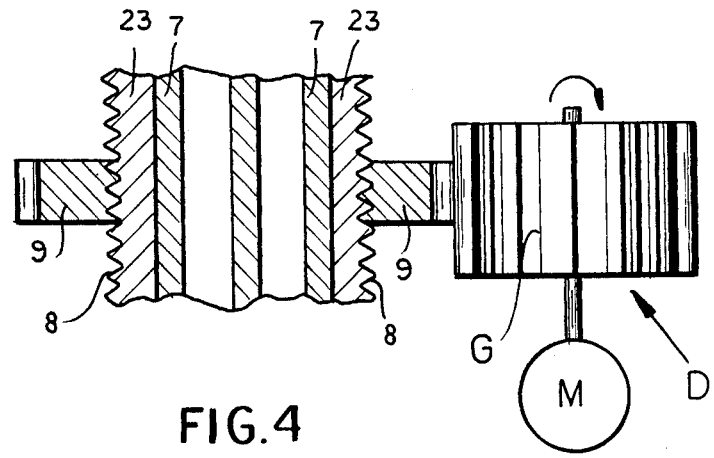
FIG. 4 is a detailed axial cross-sectional view showing another embodiment of the chuck or collet actuating apparatus according to my invention with a drive mechanism for the threaded ring.
Figure 5:
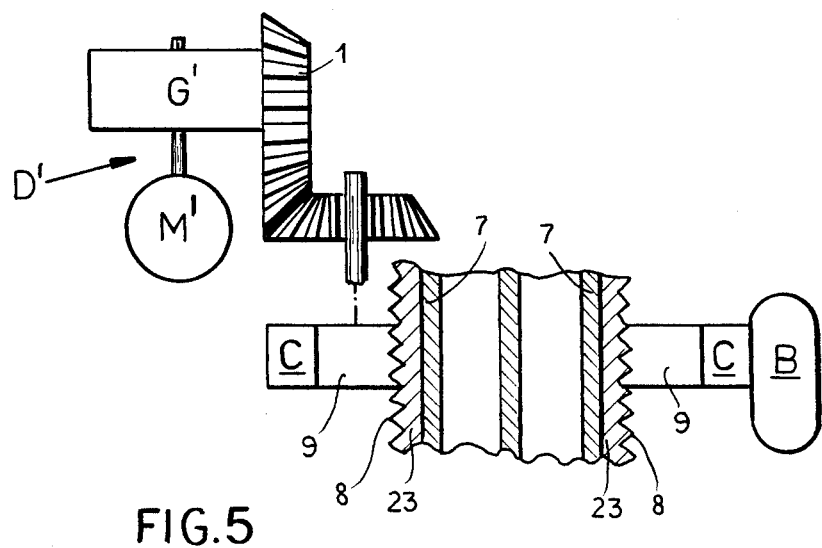
FIG. 5 is a detail axial cross-sectional view showing an additional embodiment of the chuck or collet actuating apparatus according to my invention with a drive and brake device as well as a coupling for the threaded ring.

In operation in this embodiment, rotation of the threaded ring 9 occurs by hand with the clamping cylinder 1 stopped. It is also possible to provide a controllable motorized drive mechanism D having a motor M and gear unit G as shown in FIG. 4 or a braking device B acting on the threaded ring 9 with a drive D' rotating the clamping cylinder 1 about a controllable angle (FIG. 5) to rotate the threaded ring 9 on the projecting portion 23.

In the latter case, the threaded ring 9 is held fixed by the braking device B, while the drive D' rotates the clamping cylinder 1 and/or the machine tool spindle carrying it about a predetermined angle or for a predetermined number of revolutions, which is easily provided in the modern machine tool(controlled rotation about the C-axis).

Understandably, the braking device B must be provided so that it does not hinder the threaded ring 9 secured from rotation in regard to the axial motion occurring on rotation of the clamping cylinder 1.

There is also another possibility. The drive or braking device B acting on the threaded ring 9 may engage by an engagable and disengagable coupling C on the threaded ring, whereby the coupling is only engagable when the threaded ring 9 is rotated and/or is braked.

I claim:

1. In a chuck actuating apparatus for a rotating spindle of a machine tool comprising a rotating clamping cylinder, an axially slidable clamping piston rotating with said clamping cylinder and a coaxial cylindrical projecting portion in said clamping cylinder, the improvement wherein said projecting portion carries a thread, on which a threaded ring is guided and engaged, which is provided with a coaxial undercut annular groove in an opposing surface facing said clamping cylinder and is securable against rotation on said projecting portion, a plurality of stop pins being provided which are axially unshiftable relative to said threaded ring and which engage and slide in said annular groove, said stop pins projecting through an opposing wall of said clamping cylinder into an interior space axially slidable and sealing axially in said clamping cylinder and forming a stop for said clamping piston.

2. The improvement defined in claim 1 in which each of said stop pins has a bolt head and said annular groove has a mouth radially opening interiorly in said threaded ring, through which said stop pins are introduced radially into said annular groove with said bolt heads fitting in said undercut annular groove.

3. The improvement according to claim 1 further comprising a plurality of setscrews guided radially in said threaded ring distributed circumferentially about said threaded ring for securing said threaded ring on said projecting portion.

4. The improvement according to claim 1 further comprising a controllable drive mechanism for rotation of said threaded ring on said projecting portion.

5. The improvement according to claim 1 further comprising a controllable braking device acting on said threaded ring for rotation of said threaded ring on said projecting member and a drive rotating said clamping cylinder about a controllable angle.

6. The improvement according to claim 5 in which said drive and said braking device acting on said threaded ring engages by an engagable and disengagable coupling on said threaded ring.

7. A chuck actuating apparatus for a machine tool comprising:
   a rotating clamping cylinder;
   an axially slidable clamping piston rotating with said clamping cylinder;
   a coaxial cylindrical projecting portion in said clamping cylinder having a thread;
   a threaded ring guided and engaged on said thread of said projecting portion, which is provided with a coaxial undercut annular groove in an opposing surface facing said clamping cylinder and is securable against rotation on said projecting portion;
   a plurality of stop pins, each having a bolt head, being provided which are axially unshiftable relative to said threaded ring and which engage and slide in said annular groove, said stop pins projecting through an opposing wall of said clamping cylinder into an interior space axially slidable and sealing axially in said clamping cylinder and forming a stop for said clamping piston, said annular groove having a mouth radially opening interiorly in said threaded ring, through which said stop pins are introduced radially into said annular groove with said bolt heads fitting in said undercut annular groove; and
   a plurality of setscrews guided radially in said threaded ring distributed circumferentially about said threaded ring for securing said threaded ring on said projecting portion.

* * * * *